Jan. 6, 1931.   H. A. TRAVERS   1,788,134
PERIODIC RECLOSING CIRCUIT BREAKER
Filed Jan. 5, 1923
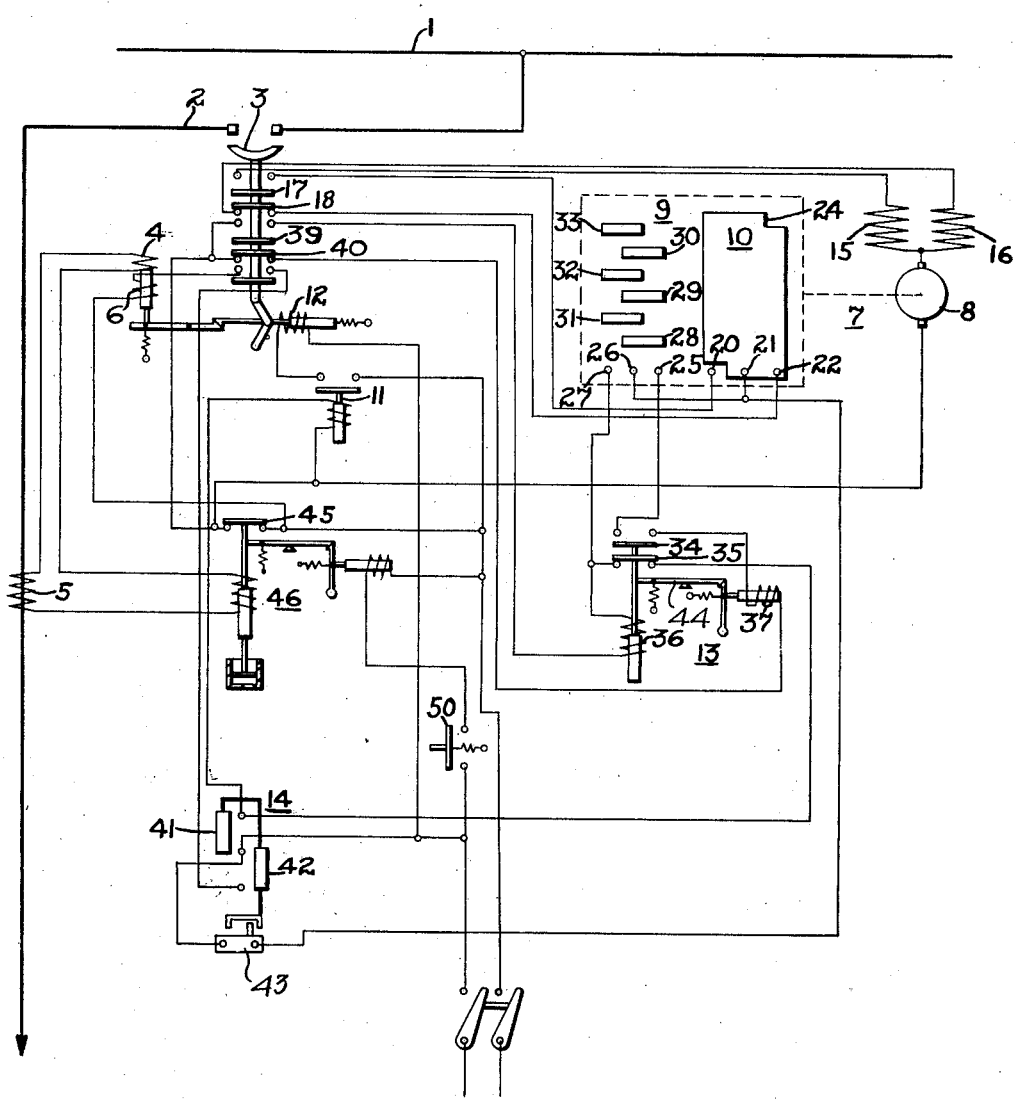
WITNESSES:
R. J. Butler.
J. E. Foster
INVENTOR
Henry A. Travers.
BY
Wesley G. Carr
ATTORNEY Patented Jan. 6, 1931

1,788,134

UNITED STATES PATENT OFFICE

HENRY A. TRAVERS, OF FOREST HILLS BOROUGH, PENNSYLVANIA, ASSIGNOR TO WESTINGHOUSE ELECTRIC & MANUFACTURING COMPANY, A CORPORATION OF PENNSYLVANIA

PERIODIC RECLOSING CIRCUIT BREAKER

Application filed January 5, 1923. Serial No. 610,784.

My invention relates to circuit interrupter systems and particularly to periodic reclosing systems for interrupters.

One object of my invention is to provide a control system whereby a circuit interrupter may be reclosed a predetermined number of times in accordance with a predetermined cycle of operation in order to reconnect a feeder circuit to a supply system after the feeder circuit has been disconnected from the system by reason of abnormal conditions therein.

Another object of my invention is to provide a control system, of the above-indicated character, containing apparatus that shall lock out a feeder circuit to preclude the reconnection thereof to the supply system if the faulty condition thereon persists after a predetermined interval of time during which the interrupter shall have been reclosed a predetermined number of times.

A further object of my invention is to provide a system, of the above-indicated character, in which the apparatus shall reset itself for a subsequent operation if the faulty condition should be cleared before the full predetermined cycle of operation is completed.

A further object of my invention is to provide a system, of the above-indicated character, whereby a circuit interrupter shall be reclosed a predetermined number of times at predetermined intervals after the first opening of the interrupter by reason of an abnormal or faulty condition in the circuit, and that shall preclude further automatic operation of the interrupter if the faulty condition is not eliminated during the predetermined cycle including such operations.

A still further object of my invention is to provide a system of the above-indicated character that shall be simple in construction and fully automatic and reliable in its operation.

In practicing my invention, I provide means for opening the circuit interrupter to disconnect a feeder circuit from its supply circuit upon the occurrence of abnormal conditions in the feeder circuit. Since it is possible that the faulty condition may be a temporary one, I also provide a relay embodying means for automatically effecting the reclosure of the interrupter a predetermined number of times, for example, three times, at pedetermined intervals after the first opening thereof. If the faulty condition clears after the first or second reclosing, but before the third reclosing, the interrupter will remain closed and the relay will reset itself to its initial position to be ready for operation if a faulty or abnormal condition should again occur.

If the faulty condition which caused the opening of the interrupter the first time should persist, after the interrupter has been reclosed three times, and should effect the opening of the interrupter after the third reclosure, an auxiliary relay would then be rendered effective to lock out the feeder circuit by precluding further automatic operation of the circuit interrupter. It would then be necessary to reclose the interrupter manually, which would be effected only after the faulty condition had been eliminated.

The accompanying drawing is a diagrammatic view of an electrical system containing apparatus that operates in accordance with my invention.

Referring to the accompanying drawing, energy is derived from a supply circuit 1 and transmitted to a feeder or load circuit 2 through a circuit-controlling device or interrupter 3. While the feeder circuit is in normal condition, it is connected to the supply circuit 1. Upon the occurrence of abnormal conditions therein, such as may be caused by short-circuit or excessive overload, a trip coil 4 is energized from a current transformer 5 to open the interrupter 3, thereby disconnecting the feeder circuit from the supply circuit.

Since the faulty condition that caused the actuation of the interrupter, to disconnect the two circuits, may be merely temporary, it is desirable to automatically effect the reclosing of the interrupter without waiting until an inspector may discover that the feeder circuit is disconnected from the supply circuit.

In order to effect such reclosure, I provide a motor-driven relay 7 comprising a motor 8, a circuit-controlling member 9 serving as a timing means and a circuit-controlling member 10 serving as a limit switch. I provide also a relay 11 for controlling the circuit of the closing coil 12 of the interrupter and an auxiliary relay 13 for controlling the energization of the closing coil of relay 11. A manually-operable control switch 14 is provided to control the interrupter 3 manually and to suspend the automatic operation of the system, when desired.

The motor 8 comprises two field windings 15 and 16 whereby the direction of rotation may be reversed. The circuits of these windings are respectively controlled by the limit switch 10 in conjunction with two interlock switches 17 and 18 that are operated and controlled by the circuit interrupter 3.

The limit switch 10 comprises three stationary contact members 20, 21 and 22 and a bridging member 24 so constructed, as illustrated in the accompanying drawing, as to permit the engagement of the contact members 21 and 22 while the switch is in its initial position.

The timing means 9 comprises three stationary contact members 25, 26 and 27 that are adapted to be engaged by the associated bridging portions, as illustrated in the drawing. The contact member 25 is adapted to engage portions 28, 29 and 30 in succession while the contact member 27 engages contact members 31, 32 and 33 in succession. The contact member 26 will engage all of said portions in succession. The contact member 25 will be engaged by the bridging member 28 somewhat before the contact member 27 will be engaged by the bridging portion 31.

By properly proportioning the gear ratio between the motor and the drum, upon which the timing means 9 and the limit switch 10 are mounted, any desired interval of time may be obtained for one complete cycle of operation of the relay. Similarly, by properly spacing the bridging portions 31, 32 and 33, any desired time intervals for reclosure of the interrupter 3 may be obtained. For example, the portions 31, 32 and 33 may be so spaced as to procure a reclosing interval of thirty seconds for the first reclosure, a second interval of one minute between the reopening after such reclosure and a second reclosure, and a third interval of two minutes between the subsequent opening and the third reclosure.

While I am specifying timing intervals of one-half minute, one minute and two minutes by way of example, it is obvious that any desired timing intervals may be secured, by properly spacing the bridging portions 31, 32 and 33. Moreover, any number of reclosures may be effected by providing a corresponding number of contact portions to engage the contact members 25, 26 and 27.

Relay 13, which serves to control the energization of the closing coil 12 to open the circuit thereof after the interrupter is closed each time, and also to preclude further energization of the closing coil when a faulty condition persists, is provided with two switches 34 and 35, an operating coil 36 and a reset coil 37. The operating coil 36 is controlled by the timing bridging portions 31, 32 and 33 in conjunction with the contact member 27 and by a switch 39 that is operated and controlled by the interrupter 3. The reset coil 37 is similarly controlled by the bridging portions 28, 29 and 30 and a switch 40 that is controlled by the interrupter 3.

The control switch 14 comprises a switch 41 for controlling the closing coil relay 11, a switch 42 for controlling a shunt trip coil 6 and a switch 43 for removing operating potential from the motor-driven relay 7 to suspend automatic operation of the control system.

The switch 43 is normally closed when the control switch 14 is in neutral position. When the control switch is moved to trip position to close the switch 42, the switch 43 is opened and maintained open until the switch 14 is moved to closed position to close switch 41.

The interrupter 3 is closed by moving the control switch to close switch 41. The closing coil relay 11 is then energized through the switch 45 of a lockout relay 46 to complete the circuit of the closing coil 12. The switch 39 is closed by the interrupter 3, when closed, and co-operates with the switch 41 of the control switch 14 to energize the operating coil 36 of the relay 13. The relay 13 is thereupon actuated to open position and maintained in such position by the latching member 44.

The lockout relay 46 is adjusted to respond only to abnormal currents of predetermined values and normally remains in its de-energized position. A switch 50 is provided to reset the relay electrically.

Upon the occurrence of abnormal conditions in the circuit 2 that cause excessive currents to traverse the circuit, the trip coil 4 becomes sufficiently energized from the current transformer 5 to open the interrupter 3. The interrupter 3, in opening, closes switches 18 and 40. Switch 18 co-operates with contact members 21 and 22 and the bridging member 24 of the limit switch 10 to energize the motor 8 in such direction as to move the drum, in a forward or downward direction. Shortly after the drum commences to move, the contact member 20 is engaged by the bridging member 24 of the limit switch 10. Simultaneously the bridging portion 28 engages contact members 25 and 26 and co-operates with switch 40 of the interrupter to energize the reset coil 37 of the relay 13. The switch 35 is thereupon reclosed.

Thirty seconds after the interrupter is opened, the portion 31 of the timing means 9 engages the contact members 26 and 27. The relay 11 is thereupon energized to close the circuit of the closing coil 12 and the interrupter 3 is thereupon reclosed. Simultaneously with the reclosing of the interrupter and the closing of its auxiliary switch 39, the operating coil 36 of relay 13 is energized to open the switch 35 which is thereupon latched in its open position by the latching member 44 of the relay 13. The circuit of the closing coil is thus opened after each closure of the interrupter.

If the faulty condition has been eliminated before the interrupter 3 is reclosed, the interrupter will remain closed and the motor will be energized by means of the switch 17 through the contact members 20 and 21 and the bridging member 24 of the limit switch 10 to effect the operation of the relay 7 in the reverse direction until the contact member 20 is disengaged by the bridging member 24. Under such conditions, the motor will be deenergized and the relay will remain in such position until the occurrence of another faulty condition which will require the automatic reclosing of the interrupter.

If the faulty condition has not been cleared, the interrupter will immediately be reopened, depending upon the time setting of mechanism associated with the trip coil 4 and, instead of the motor being energized by the switch 17 to reverse its direction, it will continue to be energized by the switch 18 to effect its operation in the forward direction. The bridging portion 29 of the timing means 9 will then engage the contact member 25 and co-operate with the switch 40 of the interrupter to energize the reset coil 37 of the relay 13. The main switch 35 of the relay 13 will thereupon be closed, and, after an interval of substantially one minute, depending upon the spacing between the bridging portions 31 and 32, the relay 11 will again be energized to effect the reclosing of the interrupter 3.

As previously explained, if the line should now be cleared of abnormal conditions, the motor will reverse its operation and reset itself in its initial position. If, however, the faulty condition persists, the interrupter will immediately reopen and the motor will continue in its forward direction. After an interval depending upon the spacing between the portions 32 and 33, the interrupter will be reclosed a third time and the relay 13 simultaneously operated to open the switch 35 and de-energize the closing coil of relay 11.

When the interrupter opens again after the third reclosing, the motor 8 continues to move in the forward direction until the contact member 22 is disengaged by the bridging member 24. The motor 8 is thereupon de-energized and will remain in such position until the interrupter 3 is closed manually or by means of the switch 41 after the faulty conditions have been eliminated. The relay 8 will then reset itself in its initial position that is illustrated in the drawing.

When it is desired to open the interrupter 3 and to suspend the automatic operation of the control system to permit working on the interrupter 3 and on the feeder circuit 2, the control switch 14 is actuated as hereinbefore described, which closes contact members 42 and opens contact members 43.

The motor-controlled relay which I employ is not a part of the present invention but constitutes the subject matter of a copending application of Roy J. Wensley, (case No. 10202), Serial No. 632,592, filed April 16, 1923, and assigned to the Westinghouse Electric & Manufacturing Company.

By means of the self-resetting relay in the system which I have described, I am able to effect the automatic reclosure of a circuit interrupter a predetermined number of times at predetermined intervals after the occurrence of an abnormal condition in the circuit and to preclude further automatic operation of the interrupter if the abnormal condition persists after a predetermined cycle of reclosing operations.

My invention is not limited to the specific apparatus that I employ nor to the particular arrangement that I have illustrated, since modifications both in the structural and timing features of the apparatus may be made without departing from the spirit and scope of my invention, as set forth in the appended claims.

I claim as my invention:

1. A circuit-breaker system including a main circuit, a circuit breaker therein, closing and tripping coils for said breaker, motor-operated and manually-operable switches for controlling said closing and tripping coils, said manual switch having close and trip positions, and an auxiliary switch actuated by said manually-operable switch for controlling the energization of the motor-operated switch to prevent operation of the motor-operated switch controlling said closing coil, when the manual switch has been operated to the trip position, until said manual switch has been actuated to the close position.

2. A system for operating a circuit breaker having closing and tripping means including electro-responsive and manually-operable means for controlling said closing and tripping means and means controlled by said manually-operable means for controlling the energization of the electro-responsive means to preclude the operation of said electro-responsive means controlling said closing means, when the manually-operable means has been actuated to energize said tripping means, until the manually-operable means is actuated to energize said closing means.

3. In a circuit-breaker system, in combination, an electric circuit, a circuit breaker for controlling the flow of current in the circuit, said circuit breaker being provided with opening and closing means, a motor-operated switch automatically operable to effect predetermined reclosing operations of the circuit breaker in response to the opening of the breaker under abnormal circuit conditions, an energizing circuit for the motor-operated switch, and a manual control switch for controlling the closing and opening operations of the breaker independently of the motor-operated switch, said manual control switch being disposed to open the energizing circuit for the motor-operated switch when actuated to effect an opening operation of the breaker.

4. In a circuit-breaker system, in combination, an electric circuit, a circuit breaker for controlling the flow of current in the circuit, said circuit breaker being provided with closing and tripping coils, means for automatically effecting the opening of the circuit breaker in response to abnormal circuit conditions, a motor-operated timing switch for effecting periodic reclosing operations of the circuit breaker, said timing switch becoming energized for operation only in response to the automatic opening of the circuit breaker, a manual control switch operable to control the energization of the closing and tripping coils of the circuit breaker independently of the motor-operated timing switch, said manual control switch being disposed to selectively control the energization of the motor-operated timing switch to render said motor-operated timing switch inoperative when the tripping coil is energized.

In testimony whereof, I have hereunto subscribed my name this 26th day of December, 1922.

HENRY A. TRAVERS.